United States Patent [19]
Wagner

[11] Patent Number: 4,624,623
[45] Date of Patent: Nov. 25, 1986

[54] WIND-DRIVEN GENERATING PLANT COMPRISING AT LEAST ONE BLADE ROTATING ABOUT A ROTATION AXIS

[76] Inventor: Gunter Wagner, Suderheide 1, D-2282 List, Fed. Rep. of Germany

[21] Appl. No.: 714,614

[22] Filed: Mar. 20, 1985

Related U.S. Application Data

[63] Continuation-in-part of Ser. No. 514,804, Jun. 22, 1983, abandoned.

[30] Foreign Application Priority Data

Oct. 26, 1981 [DE] Fed. Rep. of Germany ....... 3142434
Apr. 10, 1982 [DE] Fed. Rep. of Germany ....... 3213396
Sep. 17, 1982 [WO] PCT Int'l Appl. ... PCT/DE82/00186

[51] Int. Cl.$^4$ .......................... F03D 1/00; F03D 9/00; F03D 11/04
[52] U.S. Cl. ....................................... 416/19; 416/10; 416/196 A; 416/DIG. 8
[58] Field of Search ..................... 416/19, 119, 142 B, 416/243.10, DIGS 4, 6, 8, 196 A

[56] References Cited

U.S. PATENT DOCUMENTS

| | | | |
|---|---|---|---|
| 869,709 | 10/1907 | Homola | 416/52 A |
| 1,467,699 | 9/1923 | Vinding et al. | 416/242 X |
| 1,883,336 | 10/1932 | Chillingworth | 416/238 |
| 2,152,984 | 4/1939 | Wilford | 416/10 |
| 2,627,928 | 2/1953 | Mullgardt | 416/147 |
| 2,661,068 | 12/1953 | Gaskill | 416/196 A |
| 4,168,439 | 9/1979 | Palma | 416/111 X |
| 4,197,056 | 4/1980 | Hutter | 416/142 B X |
| 4,242,043 | 12/1980 | Poulsen | 416/11 |
| 4,264,279 | 4/1981 | Dereng | 416/19 X |
| 4,329,116 | 5/1982 | Ljungström | 416/19 |
| 4,353,702 | 10/1982 | Nagy | 416/132 B |
| 4,355,956 | 10/1982 | Ringrose et al. | 416/132 B |
| 4,360,315 | 11/1982 | Olson | 416/132 B |
| 4,432,695 | 2/1984 | Voitsekhovsky et al. | 416/11 |
| 4,522,600 | 6/1985 | Jöst | 416/11 X |
| 4,533,297 | 8/1985 | Bassett | 416/196 A X |

FOREIGN PATENT DOCUMENTS

| | | | |
|---|---|---|---|
| 158861 | 7/1952 | Australia | 416/11 |
| EP9767 | 4/1980 | European Pat. Off. | 416/19 |
| 577917 | 5/1933 | Fed. Rep. of Germany . | |
| 877280 | 12/1950 | Fed. Rep. of Germany . | |
| 907400 | 2/1952 | Fed. Rep. of Germany . | |
| 1120390 | 12/1961 | Fed. Rep. of Germany . | |
| 2814247 | 10/1978 | Fed. Rep. of Germany | 416/DIG. 4 |
| 2753956 | 3/1979 | Fed. Rep. of Germany . | |
| 2940485 | 4/1981 | Fed. Rep. of Germany . | |
| 2944718 | 5/1981 | Fed. Rep. of Germany . | |
| 542172 | 8/1922 | France | 08001979/DEX |
| 993473 | 10/1951 | France | 416/19 |
| 2464384 | 3/1981 | France . | |
| 2473639 | 7/1981 | France | 416/11 |
| 356366 | 9/1961 | Switzerland | 416/11 |
| 2049831 | 12/1918 | United Kingdom . | |

OTHER PUBLICATIONS

Popular Science, 8-1984, vol. 225, No. 2, pp. 60–63.
"The Engineer", 22/29 Aug. 1974, Morgan Grampian Ltd., London, D. Booth, When the Kuwatis Look at Power from the Wind, pp. 55 and 59.

*Primary Examiner*—Everette A. Powell, Jr.
*Attorney, Agent, or Firm*—Andrus, Sceales, Starke & Sawall

[57] ABSTRACT

The invention relates to a wind-driven generating plant for utilizing the energy contained in land and sea winds with at least one blade rotatable about a rotation axis, which is arranged in oblique-angled manner to the horizontal and is optionally connected to a pylon arranged so as to rotate coaxially to the rotation axis of the blade or blades, whereby the hub thereof used for receiving the blade base with associated energy transmission means is connected to a supporting member. Each rotor blade is at an angle $\beta$ of approximately 40° to 80° to the rotation axis of the rotor, which is oriented at an angle $\alpha$ of approximately 30° to 70° to the horizontal. The supporting member is arranged on a frame so as to rotate about a vertical axis or at an axis arranged in oblique-angled manner to the vertical.

13 Claims, 23 Drawing Figures

WIND-DRIVEN GENERATING PLANT COMPRISING AT LEAST ONE BLADE ROTATING ABOUT A ROTATION AXIS

The present application is a continuation in part application of U.S. patent application Ser. No. 514,804 filed June 22, 1983 and now abandoned.

BACKGROUND OF THE INVENTION

Various wind-driven generating plant constructions are known and the essential differentiating feature thereof is the arrangement of the rotation axis.

In the case of wind-driven generating plants with horizontal rotation axis, particularly in the case of large plants, costly constructional measures are required due to the weight of the tower, which carries the inner cell, hub, gear and generator, so that such plants require a high capital expenditure relative to the energy yield. Wind-driven generating plants with a vertical rotation axis according to Darrieus' principle, in which the lifting forces of the blade profiles are used for converting kinetic energy into rotation energy, only have use advantages compared with rotors having a horizontal rotation axis in the case of lower capacities. However, they require special starting aids, such as e.g. an electric motor or a Savonius rotor. However, due to the construction the wind capture cross-section related to the blade length and the efficiency is greater in the case of vertical rotors than in the case of horizontal rotors. To obtain the same efficiency as horizontal rotors, vertical rotors require a larger structure and consequently increased costs. For the utilization of the energy contained in land and sea winds on water surfaces, it has long been known to equip ships or boats with sails. The craft is advanced through the skillful utilization of the wind force or power, which can either take place on the wind, before the wind, leading the wind or with a beam wind. As a function of the rigging, it is possible to sail more or less close against the wind. The disadvantage is that the handling of the sails requires a large crew. Attempts have therefore been made to use rigid blade or wind surfaces as sails, but this is very expensive from the material standpoint and has also not led to satisfactory results.

SUMMARY OF THE INVENTION

The object of the present invention is to provide an apparatus for the utilization of land and sea winds, which obviates the disadvantages of the known means, is reliable to operate, has a long life and is maintenance free whilst, in the case of a simple and uncomplicated construction, has a high efficiency and only requires small crews.

According to the invention, this problem is solved in that each blade of the rotor is positioned at an angle $\beta$ of approximately 40° to 80° to the rotation axis of the rotor, which is oriented to the horizontal at an angle $\alpha$ of approximately 30° to 70° and that the supporting member for the rotor is rotatable on a frame about a vertical axis or an axis which is oblique-angled to the vertical.

BRIEF DESCRIPTION OF THE DRAWINGS

The invention is described in greater detail hereinafter relative to non-limitative embodiments and the attached drawings, wherein show:

FIGS. 13a to 13c constructions of blades in different views.

DETAILED DESCRIPTION OF THE PREFERRED EMBODIMENTS

Figure 1:
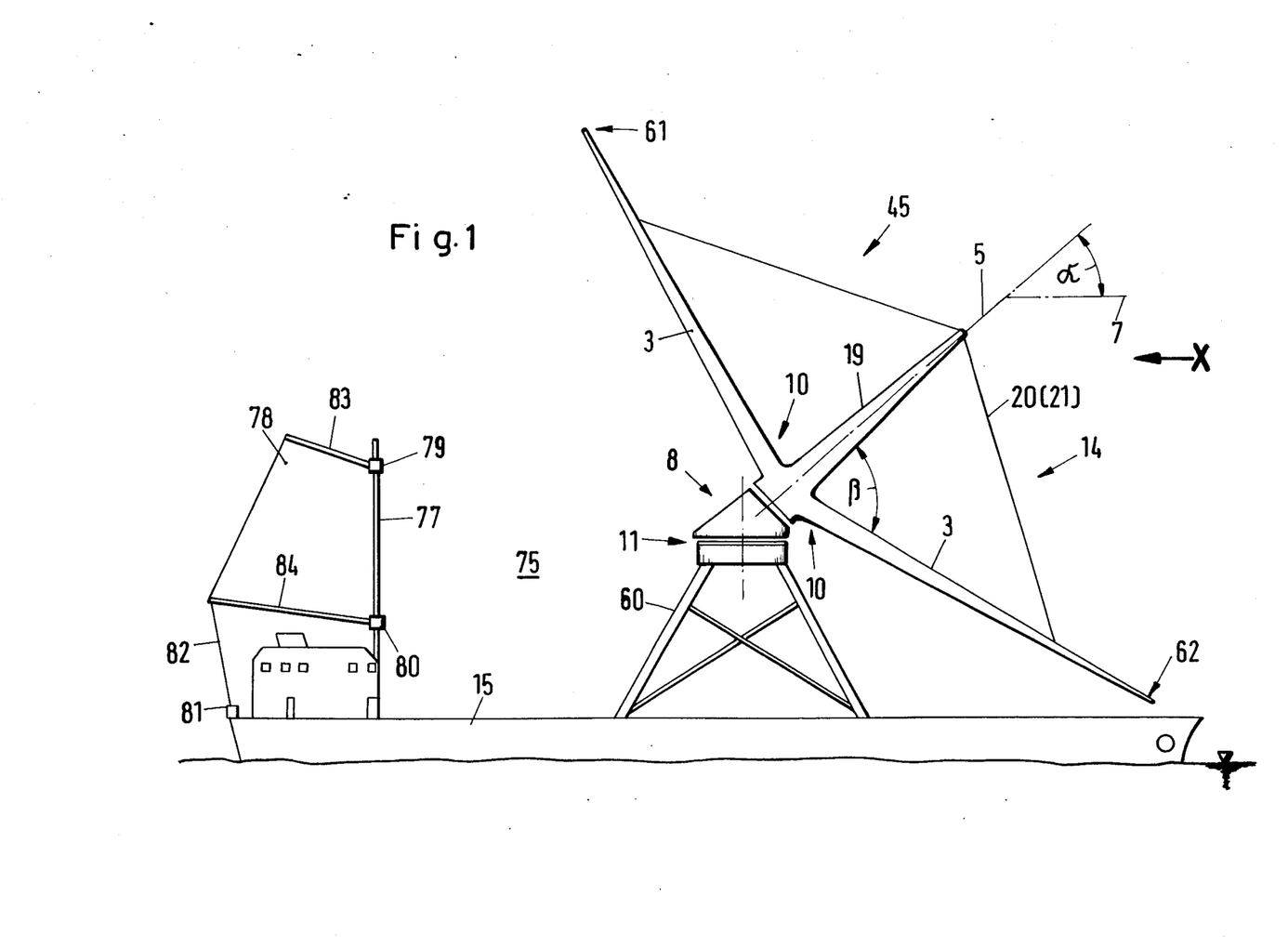
FIG. 1 a wind-driven generating plant according to the invention on a ship in a diagrammatic side view.

FIG. 1 shows a rotor 45, which is used for driving a ship 75. The hull 15 carries a frame 60 with an upper supporting member 11, to which is fixed rotor 45. Rotor 45 has a pylon 19, on which are suspended two blades 3 by means of guy ropes 20 or other connecting members 21. Connecting members 21 can be aerodynamically profiled and can e.g. comprise extruded aluminium sections. Pylon 19 is positioned at an angle $\alpha$ of 45° to the horizontal A. The angle $\alpha$ between rotation axis 5 and blades 3 is 75°. Rotor 45 is constructed in such a way that a visible sail surface for advancing the ship is formed and is exposed to the wind attack direction X. The use of rotor 45 for driving ships 75 by wind has important advantages compared with conventional sails, because the ratio of the material surface to the visible sail surface formed by rotation is very large and can be 1:25 or more. Thus, a large sail surface area can be obtained with relatively little material expenditure and only a small crew is required for controlling it. By pivoting blades 3 with respect to rotation axis 5, the visible sail surface can easily be adapted to the wind conditions. For this purpose, it is possible to provide a tensioning device 91 on the upper end section 90 of pylon 19 and by means of which it is possible to vary the free length of the guy ropes 20 or the connecting members 21. See FIG. 2 In this case, the guy ropes 20 or connecting members 21 are fixed in articulated manner by means of bearings 22 to blades 3. This construction of rotor 45 obviates the reefing of the canvas sails which is required in conventional sailing ships. In the case of rotor 45, it is possible to reduce the speed of rotation by pivoting blades 3 and in the extreme case when rotor 45 is stationary, the blade surface alone is available as a wind attack surface. Rotor 45 can also be in operative connection with the propeller by means of a mechanical, hydraulic or electric power transmission means, so that the ship can also move directly against the wind. To prevent water currents turning the rotor 45 out of the wind, it is possible on the downwash side with respect to rotor 45, to provide a mizzen sail 78 on mizzen mast 77 (FIG. 1). This mizzen sail 78 is arranged between an upper gaff 83 and a lower boom 84. Gaff and boom 83, 84 are pivotable on the mizzen mast 77 by means of joints 79, 80. A cable 82 connected to an adjusting mechanism 81 is provided on the free end portion of the lower mast 84. By a corresponding operation of the adjusting mechanism 81, the mizzen sail 78 can be set in such a way that water currents do not modify the position of ship 75 to the extent that rotor 45 turns out of the wind. The mizzen sail 78 can also be replaced by an aerodynamically shaped surface member, which can be fixed to the mizzen mast 77, or can be controllably positioned thereon by means of a not shown control device.

Figure 2:
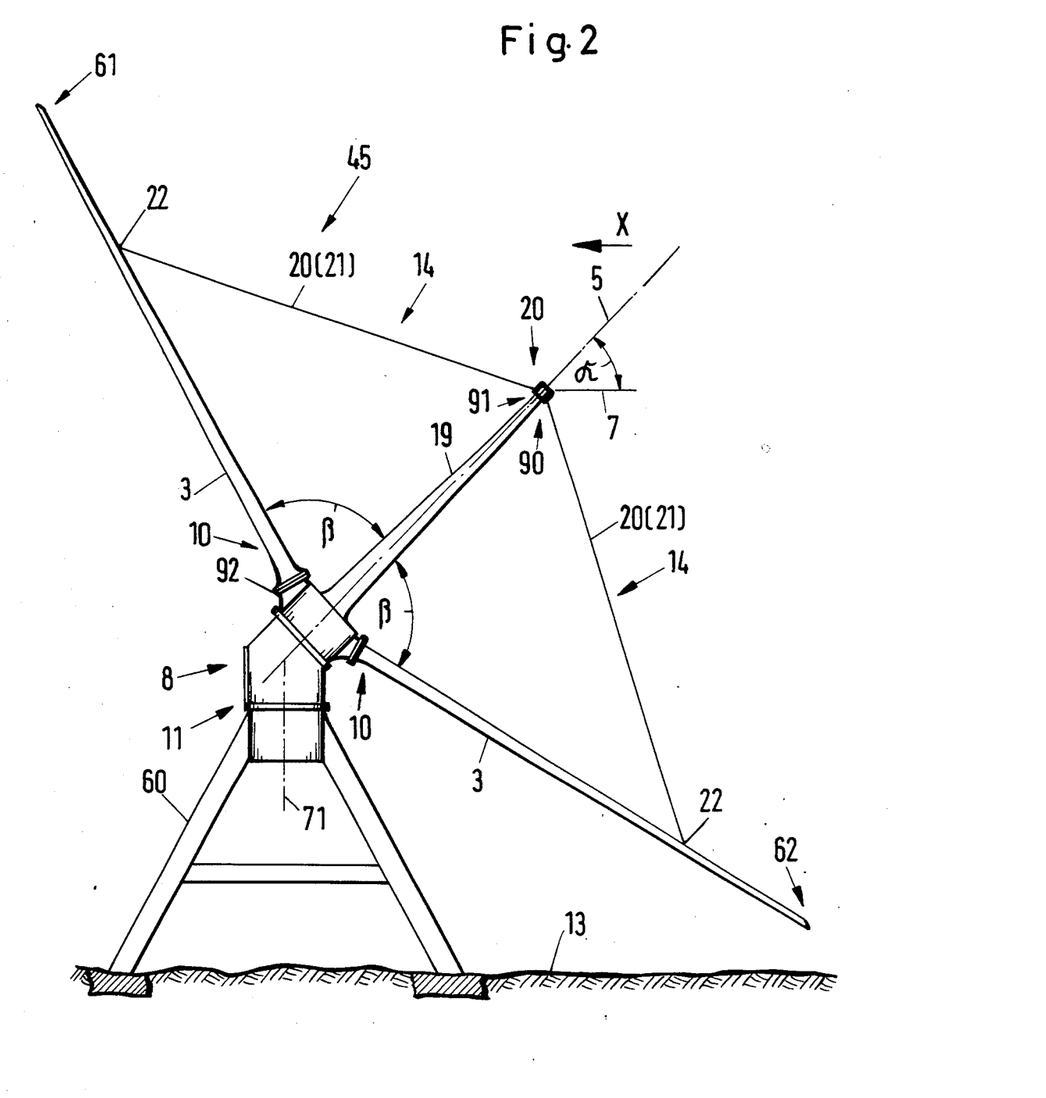
FIG. 2 a wind-driven generating plant according to FIG. 1 as a detail in side view.

FIG. 2 shows rotor 45 as a detail. Frame 60 of rotor 45 is supported on a zero level 13, which can e.g. be the deck of a ship, an offshore platform or a land location. The blade bases 10 of blades 3 are connected to hub 8 by means of flanged connections 92. In this case, the blades 3 are mounted in articulated manner on the hub. However, it is also possible to replace the flanged connections 92 by hinge connections, by means of which the blades 3 can be fixed in an articulated manner to hub 8.

Figure 3:
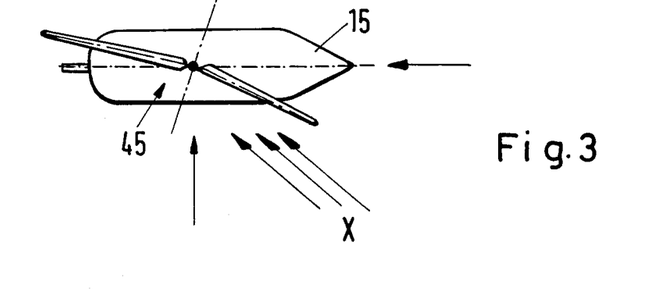
FIG. 3 a ship with the wind-driven generating plant according to FIG. 1 in a sailing position.
Figure 4:
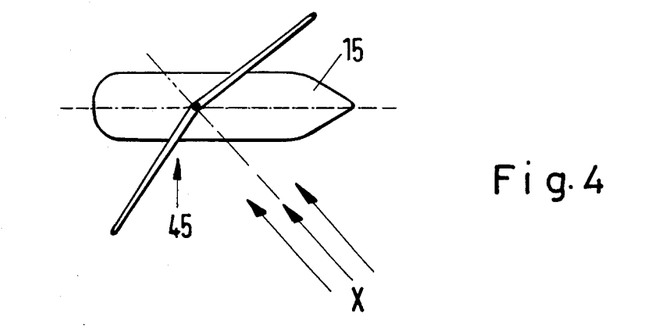
FIG. 4 the ship according to FIG. 1 with a position of the rotor of the wind-driven generating plant according to FIG. 1 for driving a generator.

FIGS. 3 and 4 show two different operating positions on rotor 45. Rotor 45 is located on a hull 15 and is functionally used as a sail with respect to the wind attack direction X according to FIG. 3. The operating position according to FIG. 4 is used for generator operation.

Figure 5:
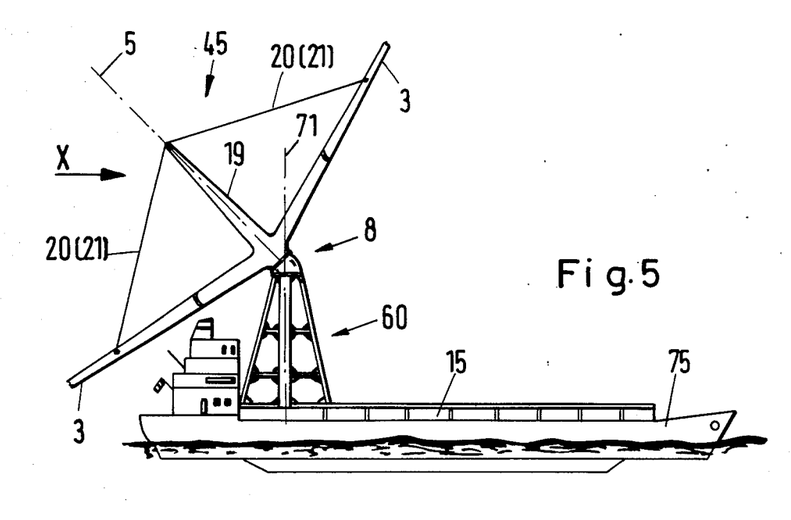
FIG. 5 the wind-driven generating plant according to FIG. 1 in another operating position and in side view.

FIG. 5 shows a ship 75 with a rotor 45, in which the wind is from astern. In all the indicated operating positions, the effective wind trapping surface can be increased in that lift or buoyancy end disks constructed as blade stubs are provided on blades 3. The surface area produced by the rotation of the blades 3 produces a slight bulge, which leads to good sailing characteristics.

Figure 6:
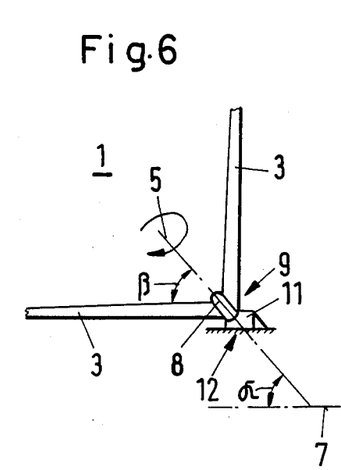
FIG. 6 a diagrammatic side view of the rotor of a wind-driven generating plant according to the invention.
Figure 7:
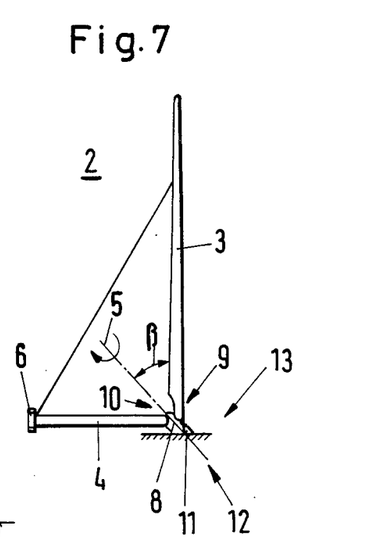
FIG. 7 a further construction of a rotor in a diagrammatic side view.

FIGS. 6 and 7 show two rotors 1, 2, whose rotation axis 5 is oriented in oblique-angled manner to the horizontal 7. Each rotor 1, 2 has a hub 8, which is rotatably connected with a supporting member 11. Supporting member 11 is arranged on a base plate 12. Rotor 1 comprises two working blades 3, whose blade bases 9 are connected to hub 8. However, rotor 2 has only a single working blade 3, with which is associated a support blade 4. Blade base 10 of support blade 4 is also connected to hub 8. A counterweight 6 is arranged on the free end portion of support blade 4. The rotation axes 5 of rotors 1, 2 are arranged at an angle $\alpha$ of approximately 45° to the horizontal 7. The angle $\beta$ between the rotation axis 5 and the working blade 3 or support blade 4 is also approximately 45°.

Supporting member 11 can be fixed to a tower-like structure, so that the rotors 1, 2 are at a distance from the ground. However, it is also possible to fix the supporting member to a base plate 12, which is approximately arranged at zero level 13. Base plate 12 or supporting member 11 can be connected to an adjusting device, which makes it possible to horizontally rotate rotors 1, 2 in different directions. It is also possible to provide rotors 1, 2 with a wind-operable guiding mechanism making it possible for rotors 1, 2 to always rotate in the incident wind flow direction. It is also possible to arrange base plate 12 with supporting member 11 on a floating body 18, thereby forming an offshore wind-driven generating plant.

Figure 8A:
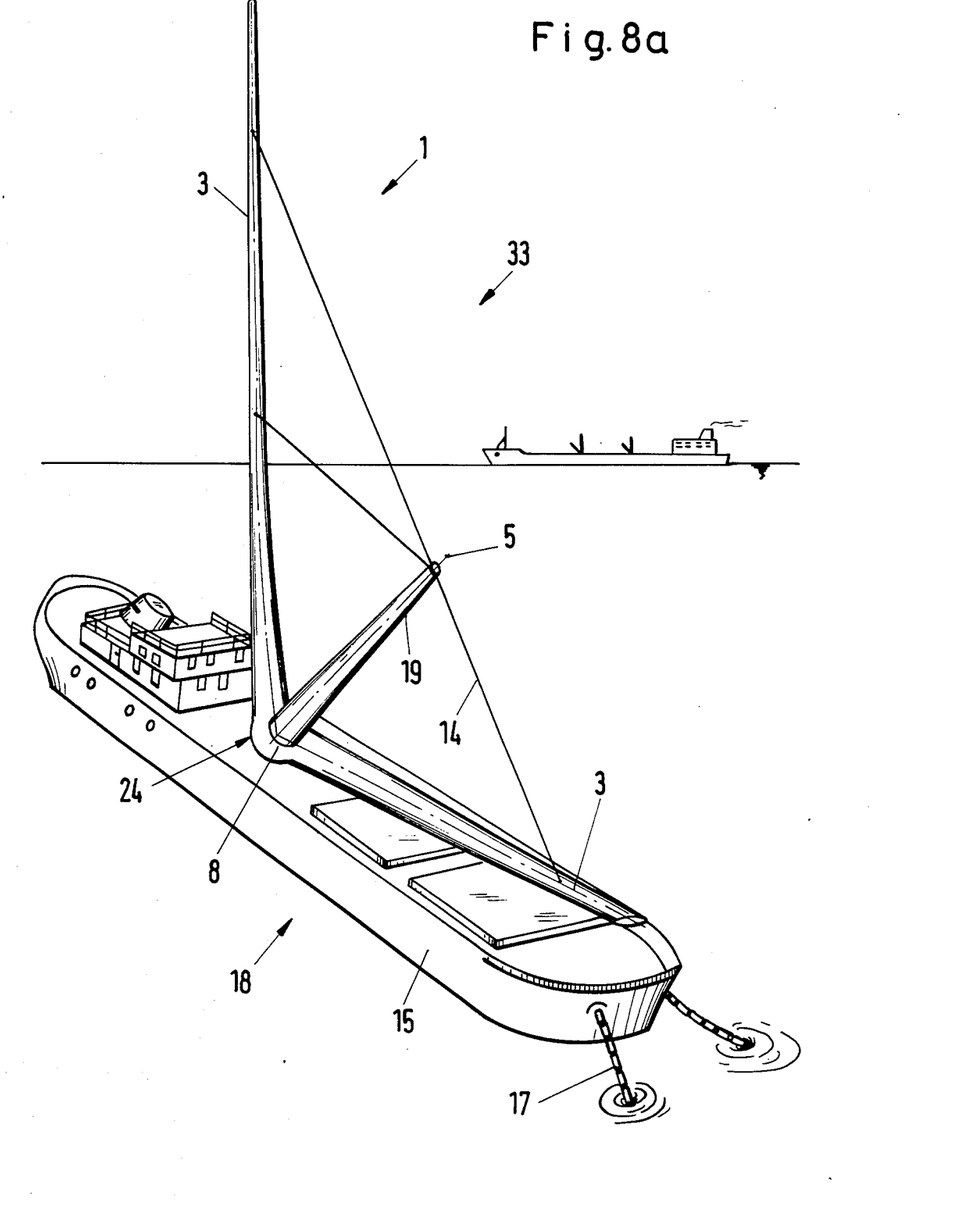
FIG. 8a a construction of a floating wind-driven generating plant in a diagrammatic view.
Figure 8B:
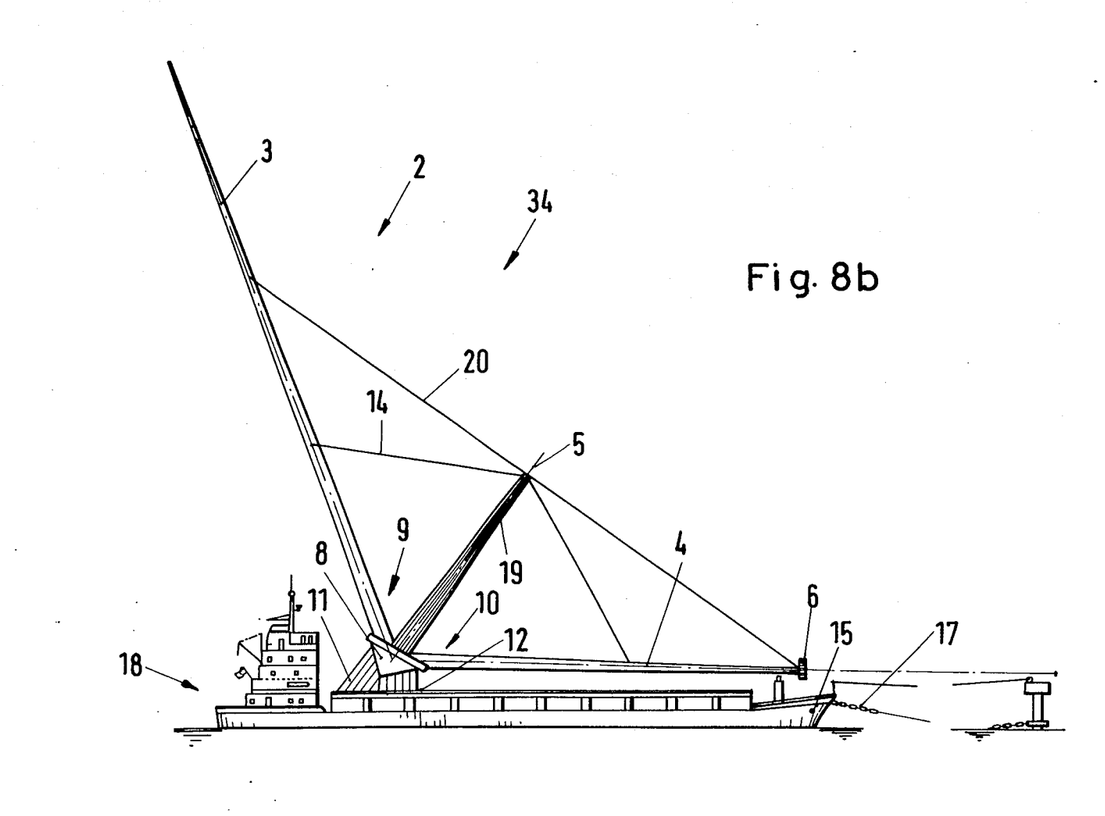
FIG. 8b a further construction of a floating wind-driven plant in a side view and a front view.

FIGS. 8a and 8b show two wind-driven generating plants 33, 34 where, in each case, the rotor 1, 2 is arranged on a hull 15.

Figure 10:
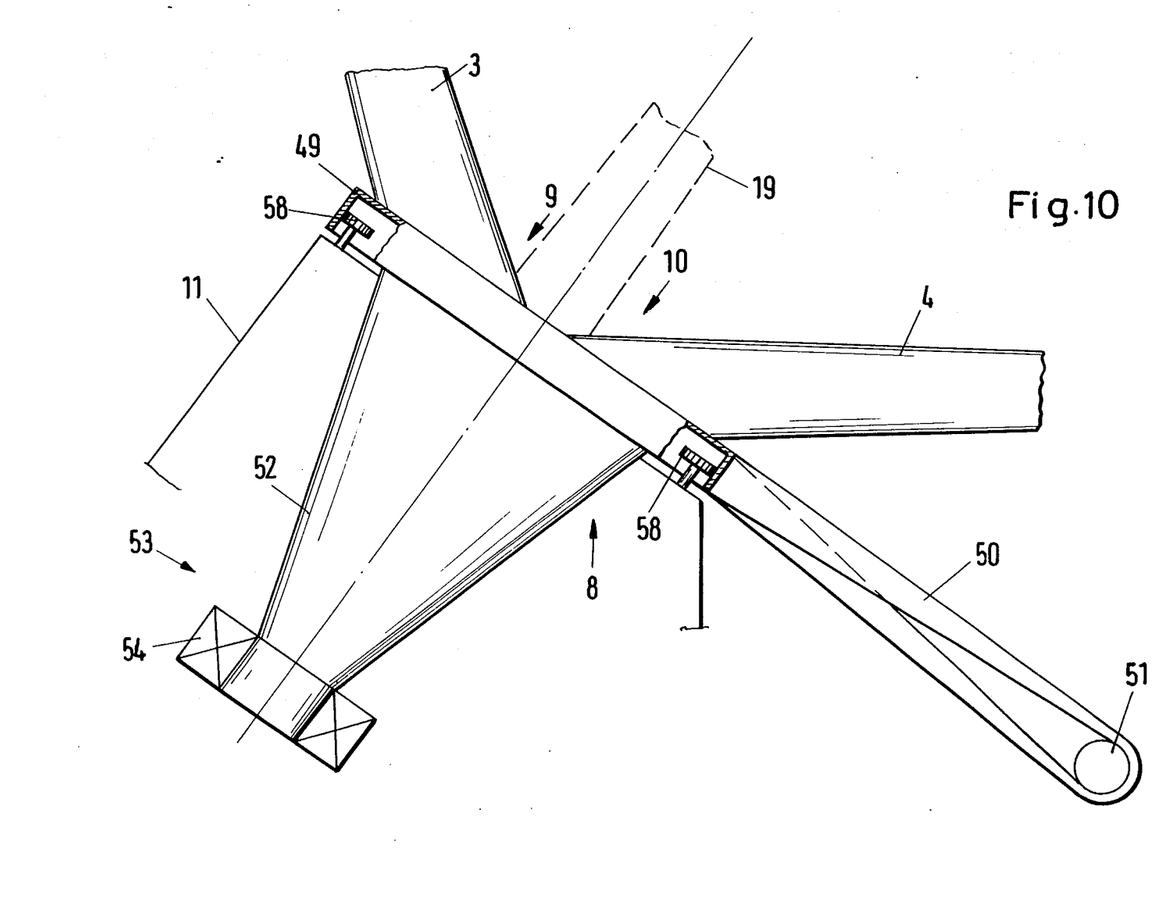
FIG. 10 the construction of the hub of the rotor in a diagrammatic side view.

Wind-driven generating plant 33 comprises a rotor 1 with two working blades 3, which are connected by means of guy ropes 14 to a pylon 19 arranged coaxially to rotation axis 5 on hub 8. The main bearing 24 is positioned in the vicinity of hub 8. The hub 8 can be constructed as shown in FIG. 10. The blade bases 9, 10 and the pylon 19 are connected to a ring 49, which can be used for reducing the speed of or locking the rotor 1, 2. The ring 49 can be rotated around fixed wheels 58 or can be kept magnetically suspended. It is possible to use the ring 49 as a pulley. If the driving belt 50 is crossed about 90° the output shaft 51 can be located horizontally. The ring 49 can be connected to a truncated cone 52 which is rotatable located by its free end portion 53 in a pivot bearing 54. The wind-driven generating plant 34 comprises a rotor 2 with a working blade 3 and a support blade 4, which are connected by means of guy ropes 14, 20 to a pylon 19, which is also arranged coaxially to rotation axis 5 on hub 8.

Figure 11:
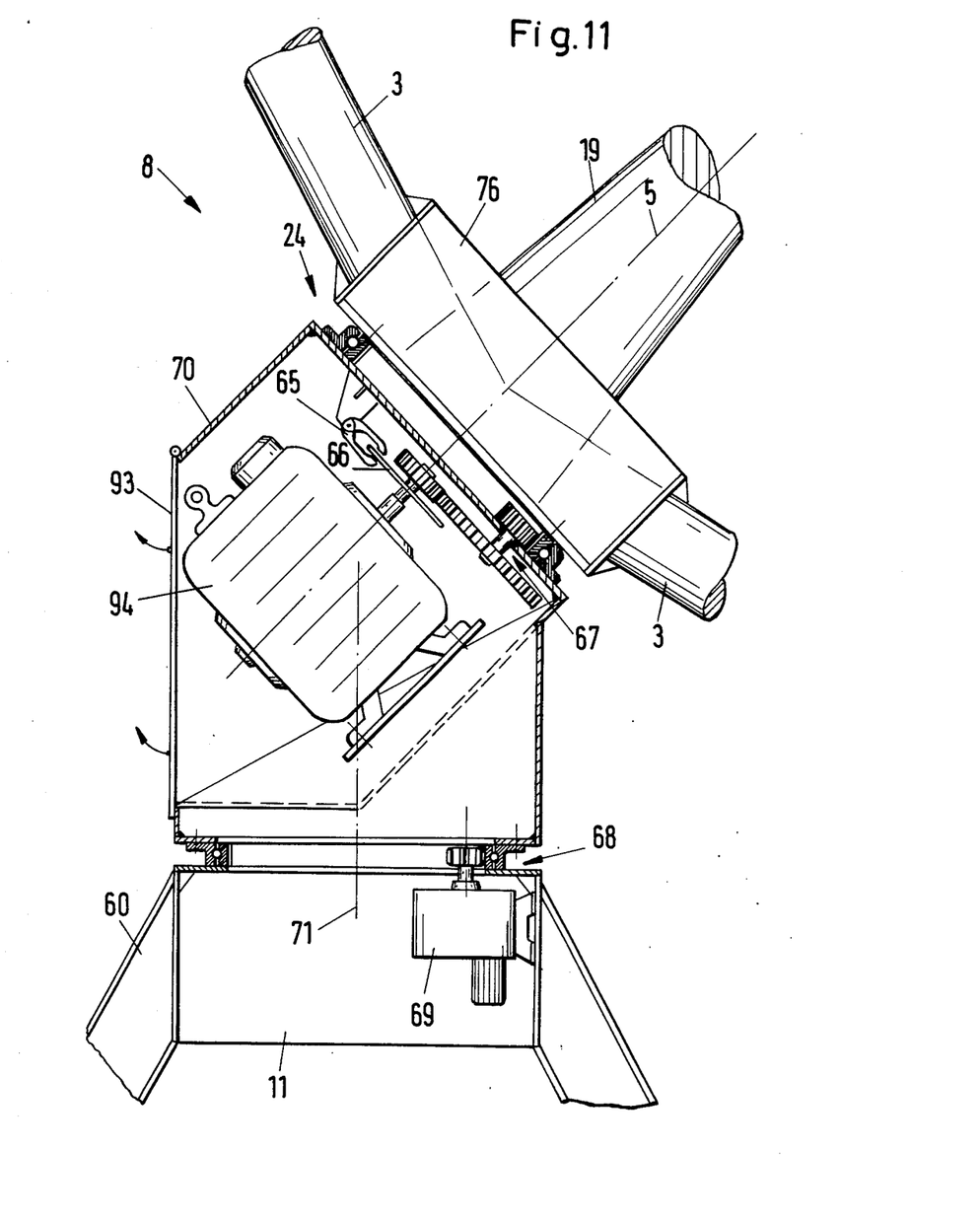
FIG. 11 the hub of a wind-driven generating plant according to FIG. 1 in a diagrammatic side view.

FIG. 11 is a larger scale representation of a possible further construction of hub 8. On the upper supports of frame 60 is formed a supporting member 11, whose upper face serves as a bearing face for an azimuth bearing 68, which is connected to a gear 69 arranged in the casing of supporting member 11. Hub 8 is rotatable about rotation axis 71 by means of the azimuth bearing 68 and this simultaneously constitutes the central axis of said bearing 68. Hub 8 has a casing 70, on which is constructed a flap 93 for maintenance purposes. The main bearing 29 is constructed on the upper end portion of casing 70 and is arranged in oblique-angled manner to rotation axis 71. Pylon 19 and blades 3 are interconnected on a box-shaped ring mount 76, which is supported on the main bearing 24 and, like casing 70, can have a tubular construction. On rotating the ring mount 76, the latter is in operative engagement with a gear 67, by means of which a generator 94 is driven. A disk 66 is arranged on the drive shaft of generator 94 and can be brought into operative engagement with a brake member 65, which makes it possible to control the rotation of the rotor.

Hull 15 is anchored by means of anchor chains 17 and can therefore rotate in such a way that rotor 1, 2 is always aligned in the incident wind flow direction. The hull 15 can also be fastened by means of stay ropes to a marine piling driven into the ocean bed.

Figure 8C:
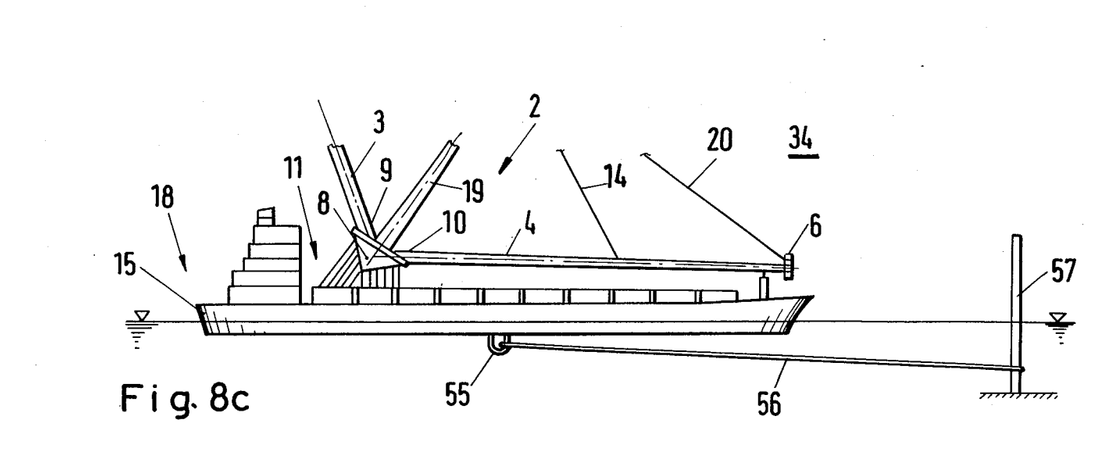
FIGS. 8c and 8d a construction of a floating wind-driven generating plant in a diagrammatic view.

For compensating one-sided moments in contrary flow configurations the anchor chains 17 or stay ropes can be fastened asymmetrically to the hull 15. For compensating flows of water like tidal currents it is appropriate to fasten stay ropes or chains 56 connected to a marine piling, piles 57 or the like to the middle of the lateral point of the ship, in the middle of the underside of the ship e.g. at the keel (FIG. 8c).

Figure 8D:
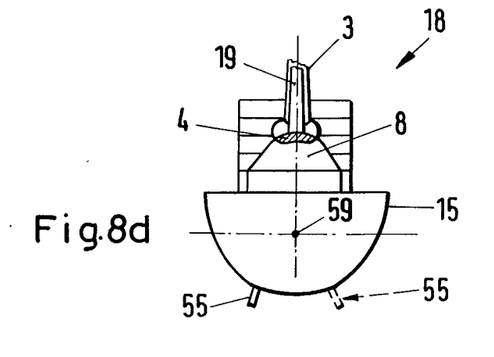

For additional compensation of the turning moment forces of the rotor 1, 2 the fastening point 55 of the stay ropes or chains 56 to the hull 15 can be displaced from the longitudinal axis 59 of the hull 15 towards the port or starboard side (FIG. 8d). In this case, the flow or water presses with equal power against the bow and the stern. Therefore, the hull 15 can only rotate around the marine piling or pile 57 but not around itself. If the centre of the surface exposed to the wind is in the middle of the hub 8, the wind can rotate the hull 15 around itself into the wind, independently of the hull 15 around the marine piling or pile 57. For more stabilization a sail can be positioned on the rear of the hull 15, e.g. a mizzen mast or sail.

Figure 9A:
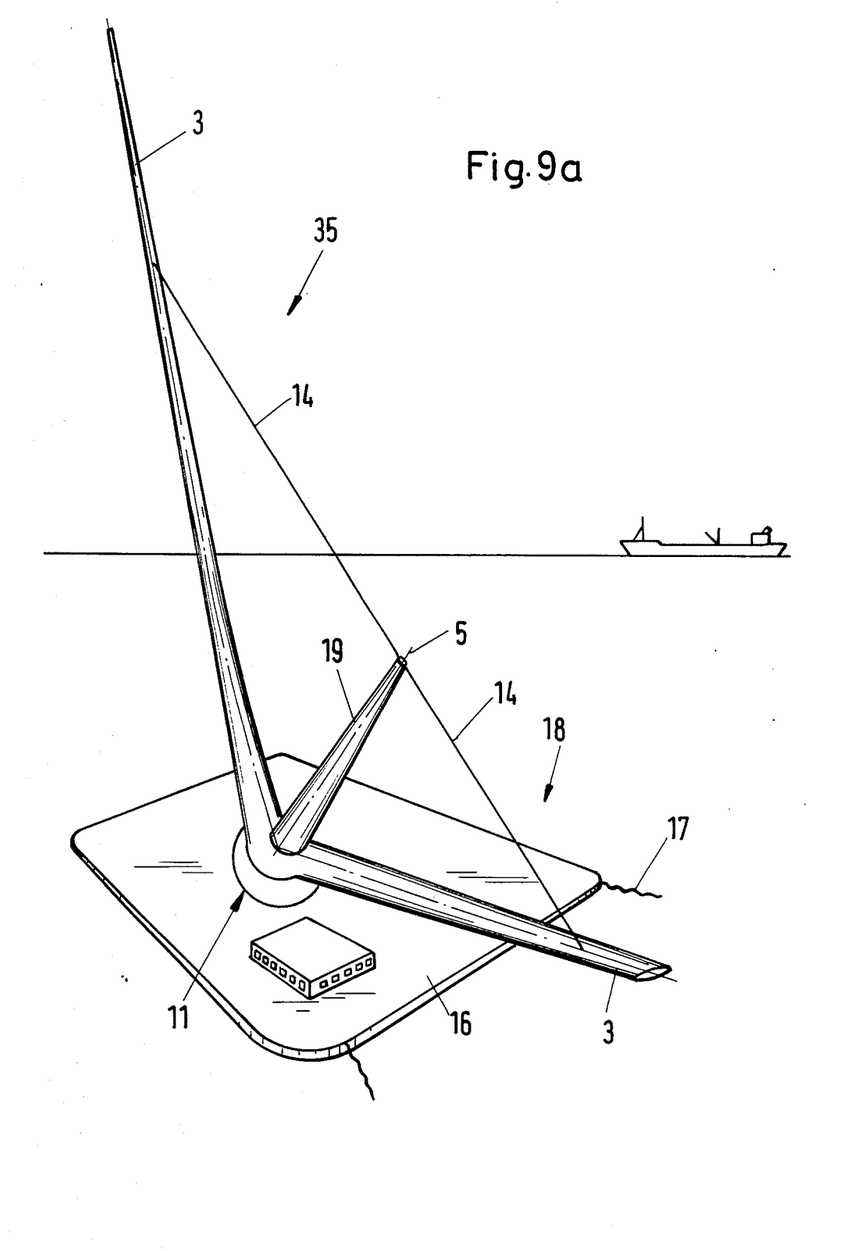
FIGS. 9a and 9b diagrammatic views of a wind-driven generating plant constructed as an offshore plant.

A further construction of the wind-driven generating plant 35 as an offshore plant is shown in FIG. 9a. In this case a rotor 1 with a pylon 19 is arranged on a pontoon 16 in the same constructional form as for plant 33. Pontoon 16 is also anchored by means of anchor chains 17 in such a way that rotor 1 can always turn into the incident wind flow direction. However, it is also possible to make the supporting member 11 rotatable by means of an adjusting device, so that in the case of a fixed pontoon 16, rotor 1 is always rotated into the incident wind flow direction. Pontoon 16 can be rectangular, circular or polygonal. It is also possible to provide pontoon 16 with lateral booms, in order to increase the stability of pontoon 16.

Figure 9B:
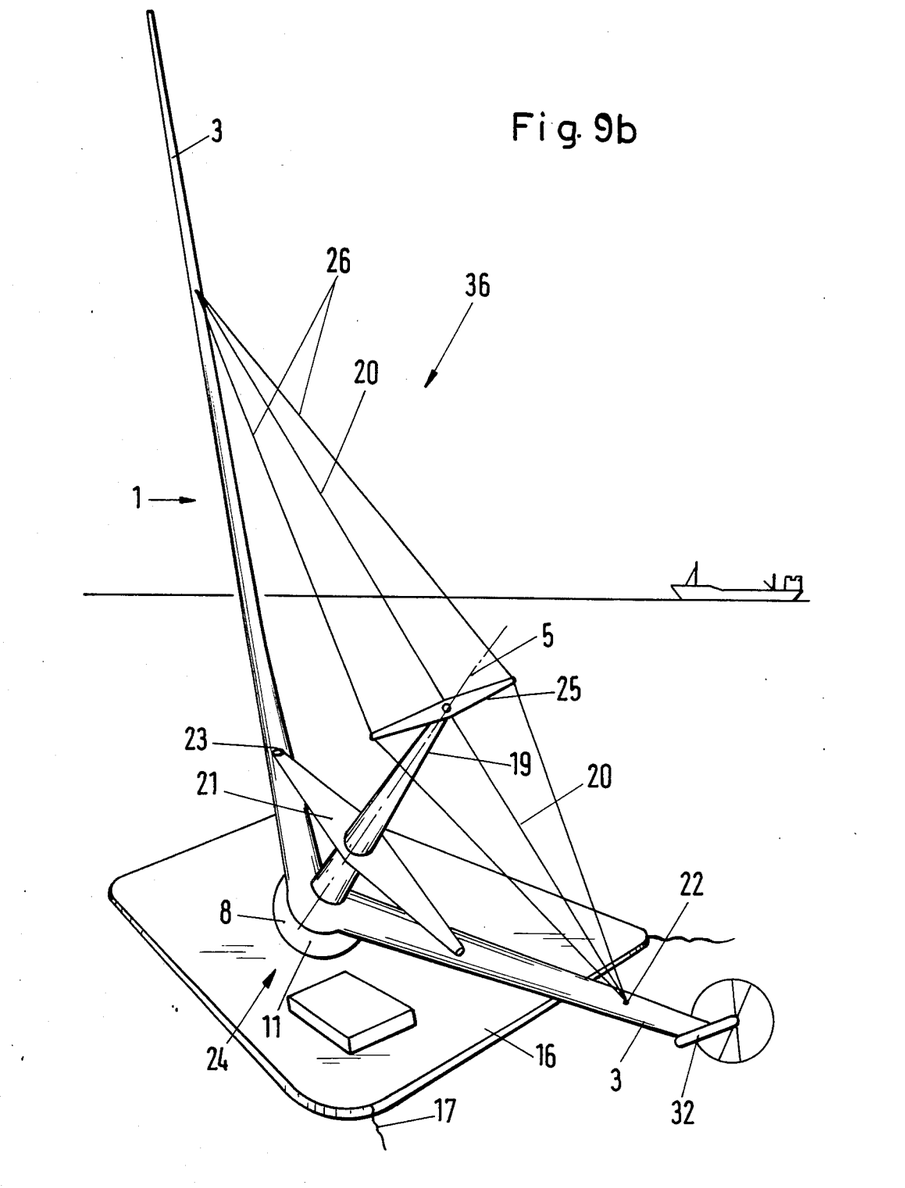

In the case of the wind-driven generating plant 36 shown in FIG. 9b, rotor 1 is provided with further stiffening means. Rotor 1 is located on a pontoon 16, which can be constructed in the same way as plant 35. The working blades 3 are connected by means of rigid connecting members 21, which are fixed to pylon 19. In order to permit rotatability of the working blades 3 about their longitudinal axes, connecting members 21 are fixed to the blades 3 by means of bearings 23. On the upper end portion of pylon 19 is provided a cross-beam 25, which is oriented parallel to the direction of movement of working blades 3 and counteracts the gravity of the latter. Wire cables 26 or the like are stretched between the end portions of cross-beam 25 and working blades 3. For this purpose bearings 22 are provided with working blades 3 in the vicinity of their longitudinal centres of gravity and cables 26 can be fixed to the said bearings. It is possible to so fix wire cables 26 and connecting members 21 to working blades 3 that, by torsion, they can be adapted to the wind forces and centrifugal forces by a variable angle of incidence. Not shown adjusting means can be used for actuating cables 26 and connecting members 21. They can either be in the form of passive adjusting members, such as springs or the like, or active adjusting members, such as hydraulic cylinders, motor drives, or as forced control means connected to the pylon 19 by means of cams. Thus, the blades 3, 4 can be cyclically adjusted to adapt to the prevailing operating conditions.

A secondary rotor 32, which can be connected to an energy generating means is provided on the free end portion of one working blade 3. In special cases it is conceivable that electricity can be generated by means of such secondary rotors 32.

However, it is also possible to use such a secondary rotor 32 as a starting aid for rotor 1.

By means of a corresponding arrangement of a secondary rotor 32 on one of the working blades 3 it is possible to construct a circular flow vortex, which increases the efficiency of the other working blade 3. As a result of the improved incident flow of the other working blades 3, particularly in the case of large spans advantages are obtained with respect to the energy decrease at blade base 9, 10.

Figure 12A:
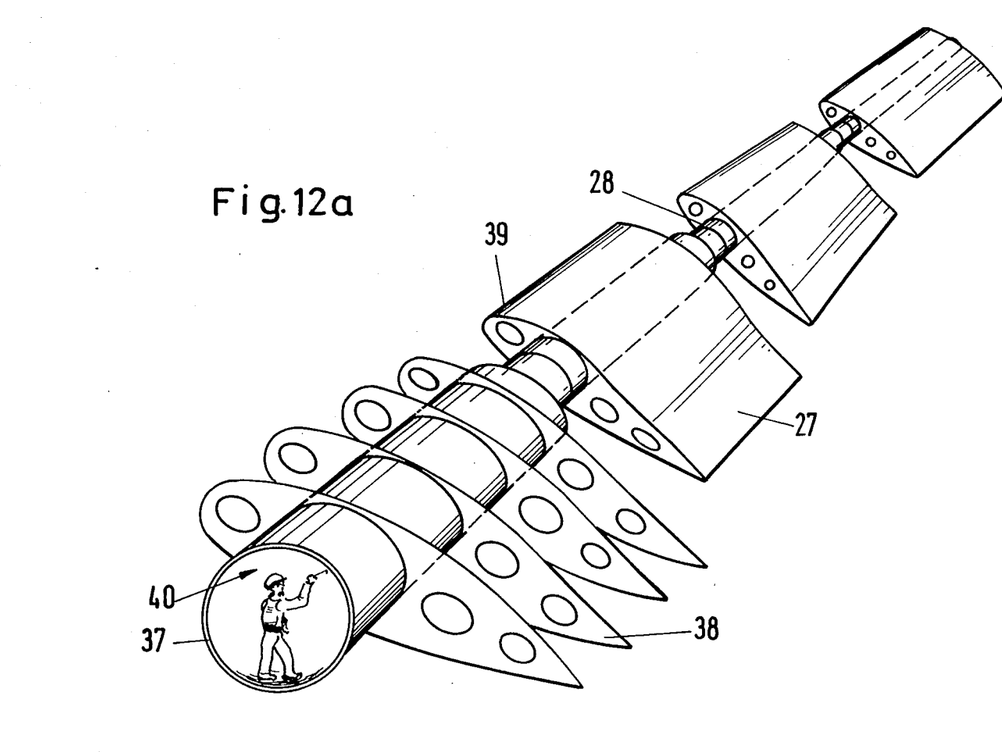
FIG. 12a a construction of a rotor blade for a wind-driven generating plant in an exploded view.

FIG. 12a shows a possible construction of a working blade 3 or support blade 4. The blade comprises a spar 37, it being possible to walk within its inner cavity 40. Cavity 40 serves to receive control elements and the like. Spar elements 38, provided with planking 39, are provided in spaced manner on spar 37. The complete blade is subdivided into different blade portions 27, which are then interconnected by means of joints 28. The individual blade portions 27 are rotatable relative to one another about said joints 28, so that it is possible to set different angles of incidence of blade portions 37 in zonal manner over the blade. This permits optimum adaptation of each blade to the particular incident flow conditions.

Figure 12B:
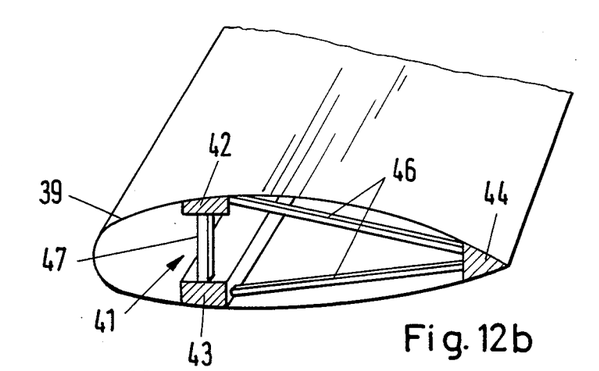
FIG. 12b a sectional side view of another construction of a blade.

FIG. 12b shows a further construction of a working blade 3 or support blade 4 in cross-section. The blade core is formed by a three-flange girder 41, comprising upper flange 42, lower flange 43 and rear flange 44. Each flange 44 is located in the vicinity of the trailing edge of the blade. Upper flange 42 and lower flange 43 are connected by struts 47. Between upper flange 42 and lower flange 43 and rear flange 44 struts 46 are provided. Struts 46, 47 can be constructed in lattice-like manner in order to increase the torsional stiffness. The three-flange girder 41 is externally surrounded by planking 39 of wood, sheet metal, etc, but it is also possible to provide a fabric covering in per se known manner.

In order to increase the efficiency of a working blade 3, the latter can also be provided with special lifting aids. It is also possible to construct the working blade 3 from two individual blades 29, 30, which can be parallel to one another, behind one another or above one another. However, they can also be arranged in sloping displaced manner to one another. With a superimposed arrangement of individual blades 29, 30, it is advantageous to connect them by profiled connecting members 31 (FIG. 13c).

Figure 13A:
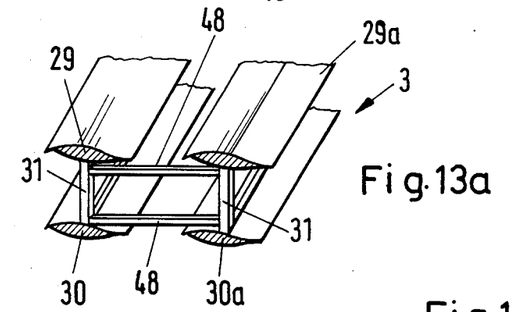
Figure 13C:
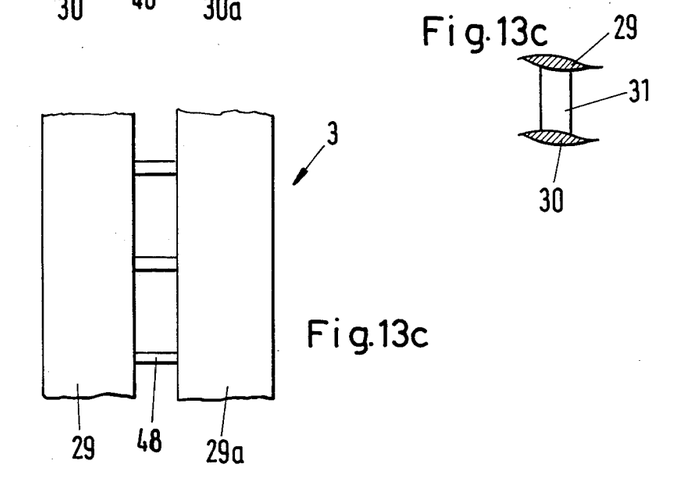

FIGS. 13a and 13c show a blade of rotor 1, 2 constructed in lattice mast-like manner. It comprises four individual blades 29, 29a, 30, 30a which are interconnected by means of vertical connecting members 31 and horizontal connecting members 48. Connecting members 31, 48 are preferably profiled and arranged in lattice mast-like manner in such a way that a great inherent rigidity of the blade formed from the four individual blades 29, 29a, 30, 30a is ensured.

The connections both within the blades 3, 4 and also connecting members 41, 38 of the lattice arrangement can take place by welding, screwing, rivetting or bonding. It is also possible to connect tubular belts and crossstruts by means of pipe joints or shrink joints, so that unweldable very-strong spring steels can be used.

Figure 14A:
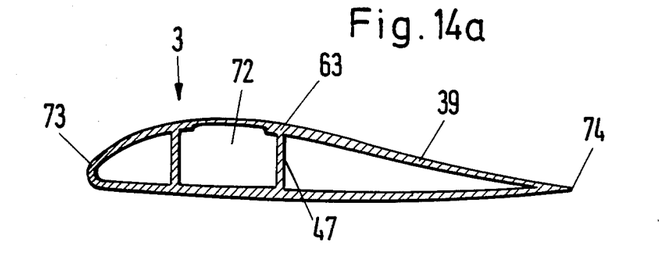
FIGS. 14a and 14b a possible profile of a blade of the wind-driven generating plant according to FIG. 1 in a diagrammatic side view and in section.
Figure 14B:
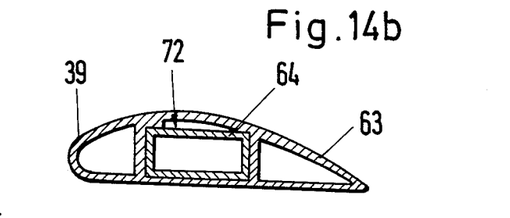

FIGS. 14a and 14b show a possible blade 3 in crosssectional form. In the case of blade 3, the planking 39 and struts 47 are constructed in one piece by extrusion. Preferably, an aluminium alloy is used as the material for the same. Internally, the extruded sections 63 are braced in such a way that the standard rectangular section 64 can be inserted for reinforcing or forming connection points on the edges of blade 3. The standard rectangular section 64 can be connected to the extruded section 63 by bolted, rivetted, welded or bonded joints. As a result of extrusion, it is possible to obtain a one-part section extending from the leading edge 73 to the trailing edge 74 of the blade, which also has a smooth surface. In order to increase the effective blade surface or the rigidity of the blade arrangement of rotor 45, the extruded section 63 can be arranged as double blades, tandem blades or the like, the individual extruded sections 63 being interconnected by optionally aerodynamically profiled connecting means. It is advantageous for said connecting means to once again comprise extruded sections. Apart from the higher static strength, the aerodyamically active surface is increased, so that the specific energy output is increased.

The blade weights can be used for compensating the wind bending moments in that e.g. in the case of a two-blade means like rotor 2, the blade weight is chosen to be approximately half the expected maximum wind moment. In the case of a single-blade means like rotor 1, the blade weight is chosen to be approximately $\frac{3}{4}$ of the expected wind moment. In the case of rotor 1, support blade 4 is made unbalanced, i.e. under full load a centrifugal force is developed, which is greater than that of working blade 3. As a standard value, the centrifugal force should be approximately $\frac{1}{4}$ of the expected maximum wind moment. For power generation purposes, appropriately generators are used, which are not bound to a fixed speed, such as e.g. self-compensated asynchronous motors. However, it is also possible to construct the main bearing 24 of hub 8 in such a way that electric power can be removed in the immediate vicinity of main bearing 24. For this purpose, either a correspondingly constructed electric generator can be integrated into main bearing 24 or a magnet system, comparable with a linear motor system is used.

Figure 15:
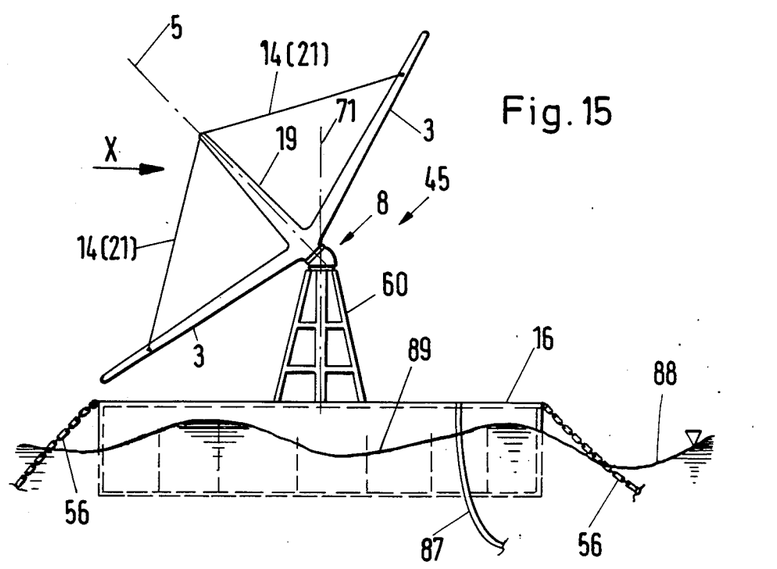
FIG. 15 the arrangement of the wind-driven generating plant according to FIG. 1 on a pontoon constructed as a wave power station in a diagrammatic side view.

As a result of the combination of the features described in the claims matched to the particular application an apparatus is obtained, which is suitable both for utilizing sea winds and land winds and which permits a much greater utilization of wind energy than the known means. For energy generation purposes, rotor 45 can be operatively connected with a generator 6 and can be brought into the operating position on ships, offshore platforms or on land. It is also possible to use rotor 45 with or without a generator 6 as an energy supply means for plants, such as desalination plants and the like. FIG. 15 diagrammatically shows the use of rotor 45 in conjunction with a wave power station, which is constructed in a pontoon 16. Pontoon 16 can be replaced by a hull 15 for the reception of the wave power station. Pontoon 16 is anchored by means of chains 56. A power cable 87 is used for transferring the power generated by rotor 45 or the wave power station. It is particularly advantageous in this construction that important mechanical parts, as well as the wind-driven generator plant with rotor 45 and the wave power station can be jointly utilized, which leads to particularly cost-favourable power generation. As a result of a corresponding spatial configuration of pontoon 16, it is also ensured that in the case of high seas 88, the function of the wave power station 89 and rotor 45 is guaranteed. Wave power station 89 can be constructed in known and very varied ways and is only indicated by broken lines in FIG. 15.

The generator can be connected in parallel with an external drive means, such as e.g. a gas turbine, in order to ensure power generation when there is no wind. It is also possible to feed the exhaust gases of the gas turbine by corresponding pipes to a nozzle system constructed on the blades of rotors 1, 2 and which rotate the latter when said gases pass into the atmosphere. Thus, the energy contained in the exhaust gases can be additionally used for generating electric power by means of rotor 1, 2.

It is also possible to connect rotors 1, 2, 45 according to the invention directly to working means such as e.g. screw conveyors. In this case, the profile of the blades of rotor 1, 2, 45 is made symmetrical, so as to be independent of the incident wind flow direction. In addtion, in the vicinity of the hub, the speed of rotor 1, 2, 45 can be transferred by means of a gear or directly to a drive shaft having e.g. a propeller for driving a ship. Thus, rotor 1, 2, 45 is also suitable for driving e.g. sports boats or toy ships, so that they can travel against the wind.

It is also possible to use rotors 1, 2, 45 in the operation of pump storage stations. In this case, a generator and a waterpump are connected in parallel to each rotor 1, 2, 45. Simultaneously, water turbines are connected to the generators parallel to rotors 1, 2, 45. Thus, rotors 1, 2, 45 are used for driving both water pumps and generators, which can take place simultaneously or alternately. When the pump storage station is full, electric power can be generated by means of the water turbines via the generators.

What is claimed is:

1. A wind-driven generating plant comprising:
   a support means;
   a rotor assembly having a pair of members, at least one of which is a blade having an airfoil cross-section, said rotor assembly having a rotor assembly rotational axis about which said assembly rotates, each of said members lying at an angle in a range of approximately 40°–80° to the rotor assembly rotational axis;
   a rotor hub mounted on said support means for rotation about a vertical axis, said hub receiving said rotor assembly for rotation about said rotor assembly rotational axis and for orienting said axis at an angle in a range of 30°–70° to the horizontal, said hub having energy transmission means coupled to said rotor assembly;
   a pylon mounted on said rotor assembly and extending along said rotor assembly rotational axis; and
   guy members extending between said rotor assembly members and pylon, said guy members being fixed to the blade eccentrically with respect to the blade center of gravity for altering the angle of incidence of said blade.

2. A wind-driven generating plant according to claim 1, wherein the angle $\alpha$ is approximately 45° and the angle $\beta$ is approximately 75°.

3. A wind-driven generating plant according to claim 1 wherein the longitudinal axis of the rotor assembly members are oriented with respect to the rotational axis of the rotor assembly in such a way that on rotating the rotor assembly, each member passes through an approximately horizontal position and can be fixed in a horizontal position.

4. A wind-driven generating plant according to claim 3, wherein each blade of the rotor is arranged at an angle $\beta$ of approximately 45° to 55° to the rotor rotational axis.

5. A wind-driven generating plant according to claim 1 wherein said rotor assembly comprises a working blade and a support blade with a counterweight, braced together by means of aerodynamically profiled guy ropes.

6. A wind-driven generating plant according to claim 1, wherein buoyancy end disks are arranged in the form of blade stubs on the end portion of said blade for increasing the effective wind trapping surface.

7. A wind-driven generating plant according to claim 1, wherein a cross-beam is constructed on the pylon and between said cross-beam and said rotor assembly members guy members are arranged in the vicinity of the longitudinal centers of gravity thereof and which are operable by means of one of passive adjusting members and active adjusting members connected to the pylon for the purpose of angularly adjusting at least said blade.

8. A wind-driven generating plant according to claim 1 wherein the setting angle of the rotor blade can be adjusted by twisting the blade or rotating blade portions about joints.

9. A wind-driven generating plant according to claim 1, wherein on at least one of the members is provided a secondary rotor constructed as a centrifugal counterweight and connected to a power generating means, in such a way that on rotating rotor assembly, a ring-shaped vortex associated therewith is formed.

10. A wind-driven generating plant according to claim 1, wherein the rotor assembly is mounted in rotary manner on an azimuth bearing.

11. A wind-driven generating plant according to claim 1 wherein the support means is arranged on a fixed substrate on at least one of land and a floating body.

12. A wind-driven generating plant according to claim 11, wherein the floating body is constructed as one of a hull and pontoon on which on the downwash side with respect to the rotor assembly, a mizzen sail means is arranged on a mizzen mast.

13. A wind-driven generating plant according to claim 11, wherein the rotor assembly is arranged on a floating body and in it is formed a wave power station.

* * * * *